United States Patent
Kim et al.

(10) Patent No.: US 11,746,666 B2
(45) Date of Patent: Sep. 5, 2023

(54) VOLUTED HOOK ANGEL-WING FLOW DISCOURAGER

(71) Applicant: Solar Turbines Incorporated, San Diego, CA (US)

(72) Inventors: Yong W. Kim, San Diego, CA (US); John F. Lockyer, San Diego, CA (US); Raymond I. Alvarez, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/543,475

(22) Filed: Dec. 6, 2021

(65) Prior Publication Data
US 2023/0175410 A1 Jun. 8, 2023

(51) Int. Cl.
*F01D 11/00* (2006.01)

(52) U.S. Cl.
CPC ........ *F01D 11/001* (2013.01); *F05D 2220/32* (2013.01); *F05D 2240/24* (2013.01); *F05D 2240/35* (2013.01)

(58) Field of Classification Search
CPC .............................. F01D 11/001; F01D 11/02
USPC ...................................................... 415/173.7
See application file for complete search history.

(56) References Cited

U.S. PATENT DOCUMENTS

| | | | |
|---|---|---|---|
| 7,238,008 B2 | 7/2007 | Bobo et al. | |
| 8,016,552 B2 | 9/2011 | Bunker | |
| 8,616,832 B2 * | 12/2013 | Smoke | F01D 5/087 |
| | | | 416/193 A |
| 9,938,843 B2 * | 4/2018 | Li | F01D 11/001 |
| 9,938,847 B2 * | 4/2018 | Li | F01D 11/08 |
| 10,240,461 B2 | 3/2019 | Ratzlaff et al. | |
| 10,428,670 B2 * | 10/2019 | Rioux | F01D 11/001 |
| 10,526,906 B2 * | 1/2020 | Nguyen | F01D 5/187 |
| 2014/0193243 A1 | 7/2014 | Nallam et al. | |

FOREIGN PATENT DOCUMENTS

| | | |
|---|---|---|
| CN | 113339076 A | 9/2021 |
| EP | 3205831 A1 | 8/2017 |

OTHER PUBLICATIONS

European Extended Search Report for EP Patent Appln. No. 22207078.1, dated May 3, 2023 (9 pgs) (U.S. Pat. No. 10,428,670 already is of record and US 20150330242 already is of record as U.S. Pat. No. 9,938,843).

* cited by examiner

*Primary Examiner* — Michael L Sehn
(74) *Attorney, Agent, or Firm* — Procopio, Cory, Hargreaves & Savitch LLP

(57) ABSTRACT

In the turbine of a gas turbine engine, disk cavities exist between rotor and stator assemblies. These disk cavities enable hot gas from the hot gas flow path to ingress between the rotor and stator assemblies with detrimental effects to the durability of the turbine. Thus, a flow discourager is disclosed that can be integrated into the platform of a stator assembly that is downstream from a rotor assembly. The flow discourager comprises a continuous external surface that defines a recirculation zone within a disk cavity that is aft to a rotor assembly to circulate the hot gas back out into the hot gas flow path.

20 Claims, 4 Drawing Sheets

VOLUTED HOOK ANGEL-WING FLOW DISCOURAGER

TECHNICAL FIELD

The embodiments described herein are generally directed to turbomachinery, and, more particularly, to a stator-side flow discourager that redirects hot gas ingress within a disk cavity between a rotor assembly and an aft stator assembly.

BACKGROUND

In the turbine of a gas turbine engine, adjacent rotor and stator assemblies cannot abut each other, since the rotor assembly must be free to rotate. Therefore, disk cavities exist between the stator and rotor assemblies. Hot gas flowing through the turbine enters these disk cavities due to the uneven pressure field generated by the interaction between rotor and stator blades. This ingress of hot gas into the disk cavities is detrimental to the durability of the turbine. Thus, the present disclosure is directed toward preventing or diminishing the ingress of hot gas into a disk cavity that is aft of a rotor assembly.

SUMMARY

A flow discourager for a turbine is disclosed. In an embodiment, the flow discourager comprises: a body integrated into a platform of a stator assembly that is downstream from a rotor assembly; and a hook portion that extends upstream from the body and hooks back towards the body, wherein the hook portion comprises a continuous external surface that defines a recirculation zone radially inward from a rotor platform of the rotor assembly.

In an embodiment, a turbine comprises at least one stage that comprises: a rotor assembly including a rotor platform; and an aft stator assembly that is downstream from the rotor assembly, wherein the aft stator assembly includes a stator platform comprising a flow discourager integrated into an upstream portion of the stator platform, and wherein the flow discourager includes a body, and a hook portion that extends upstream from the body and hooks back towards the body, wherein the hook portion comprises a continuous external surface that defines a recirculation zone radially inward from the rotor platform of the rotor assembly.

In an embodiment, a gas turbine engines comprises: a compressor configured to compress working fluid; a combustor downstream from the compressor and comprising one or more fuel injectors configured to inject fuel into the working fluid and produce a combustion reaction; and a turbine including at least one stage that comprises a rotor assembly including a rotor platform, and an aft stator assembly that is downstream from the rotor assembly, wherein the aft stator assembly includes a stator platform comprising an flow discourager integrated into an upstream portion of the stator platform, and wherein the flow discourager includes a body, and a hook portion that extends upstream from the body and hooks back towards the body, wherein the hook portion comprises a continuous external surface that defines a recirculation zone radially inward from the rotor platform of the rotor assembly.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

Figure 1:
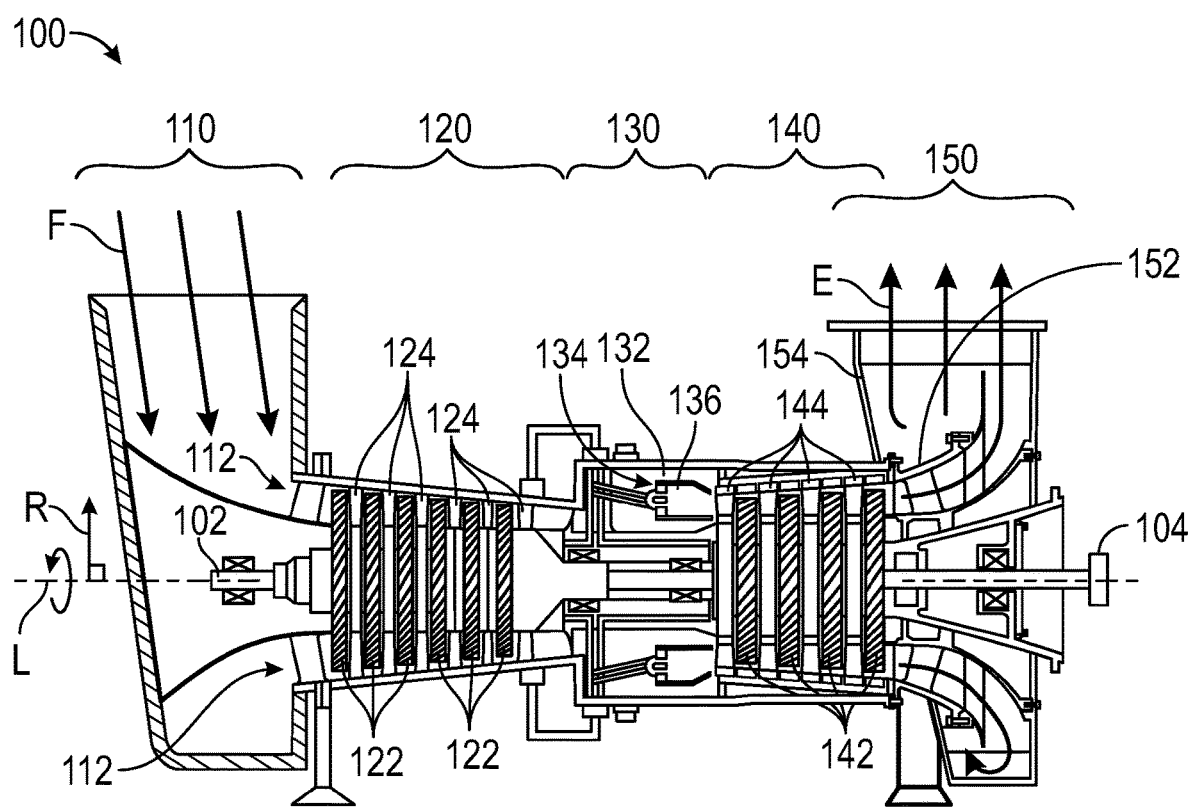
FIG. 1 illustrates a schematic diagram of a gas turbine engine, according to an embodiment.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys are sold under trademarks including, without limitation, HASTELLOY, INCONEL, WASPALOY, RENE ALLOYS, HAYNES ALLOYS, INCOLOY, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The combusting fuel-gas mixture drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred (e.g., to an external system) via power output coupling 104.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
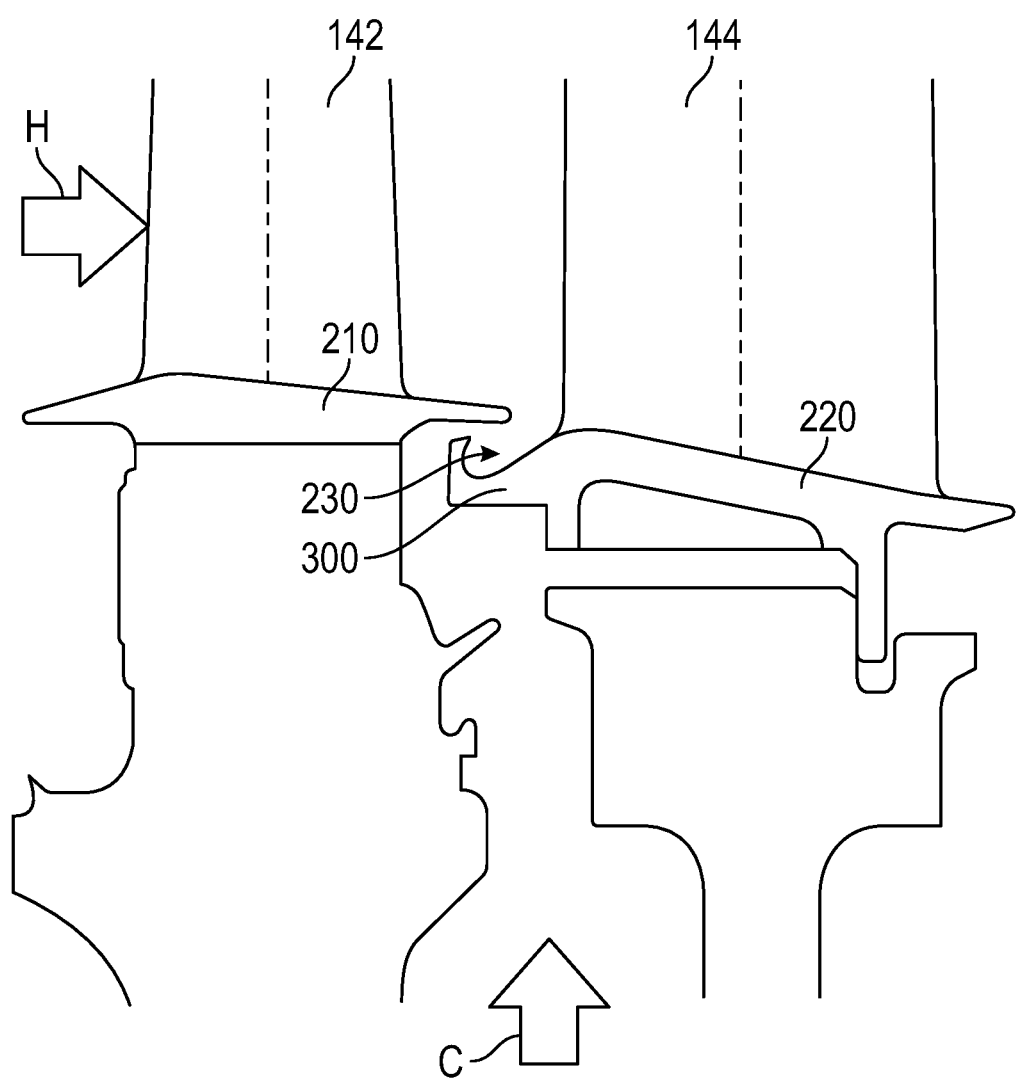
FIG. 2 illustrates a cross-sectional view of an example interface between a rotor assembly and stator assembly with an integrated flow discourager, according to an embodiment.

FIG. 2 illustrates a cross-sectional view of example interfaces between a rotor assembly 142 and an aft stator assembly 144, according to an embodiment. It should be understood that the illustrated cross-sectional view is in a plane that contains longitudinal axis L. The top of FIG. 2 is radially outward from the bottom of FIG. 2, and the left side of FIG. 2 is upstream from the right side of FIG. 2.

Rotor assembly 142 comprises a rotor platform 210 that extends annularly around shaft 102, and aft stator assembly 144 comprises a stator platform 220 that extends annularly around shaft 102. Both rotor platform 210 and stator platform 220 support airfoils extending radially outward. Since rotor assembly 142 must be able to rotate around shaft 102 while aft stator assembly 144 remains stationary, rotor platform 210 cannot abut stator platform 220. Thus, a narrow disk cavity 230 exists between rotor platform 210 and stator platform 220.

As hot gas H flows downstream through turbine 140, disk cavity 230 is subject to detrimental hot gas ingress as a result of the uneven pressure field generated by the interaction between rotor assembly 142 and aft stator assembly 144. It should be understood that hot gas H, in this case, is the combusting fuel-gas mixture that flows over the radially outward surfaces of rotor platform 210 and stator platform 220 as the mixture passes through the stages of turbine 140. As the combusting fuel-gas mixture passes over platform 210 of rotor assembly 142 to aft stator assembly 144, some of the hot gas is ingested into disk cavity 230 due to the uneven pressure field in this region. Without a flow discourager, the temperature within disk cavity 230 can, for example, exceed 1,250 degrees Fahrenheit. Thus, typically, cooling air C may be supplied radially outward between the stems of rotor assembly 142 and stator assembly 144.

In an embodiment, the leading edge of platform 220 of aft stator assembly 144 comprises an integrated flow discourager 300. The illustrated rotor assembly 142 represents a first stage of turbine 140. However, flow discourager 300 may be integrated into stator platform 220 of aft stator assemblies 144 in any stage of turbine 140, including the first stage, second stage, third stage, and so on. In addition, flow discourager 300 may be integrated into stator platforms 220 of aft stator assemblies 144 in a plurality of stages of turbine 140. For example, flow discourager 300 may be integrated into stator platforms 220 in stator assemblies 144 that are immediately aft of rotor assemblies 142 in at least the first stage and second stage of turbine 140.

As illustrated, stator platform 220 of aft stator assembly 144 extends generally axially through a space that is radially inward from rotor platform 210 of rotor assembly 142, such that the leading edge of stator platform 220 is radially inward from the trailing edge of rotor platform 210. In an embodiment, flow discourager 300 is integrated into the leading edge of stator platform 220 of the aft stator assembly 144 that is immediately downstream from a rotor assembly 142.

It should be understood that stator platform 220, including flow discourager 300, may form a continuous annulus around longitudinal axis L. Similarly, rotor platform 210 may form a continuous annulus around longitudinal axis L. In other words, in reality, the cross-section illustrated in FIG. 2 is rotated around longitudinal axis L to form a complete ring. Flow discourager 300 can be, but does need to be, formed as a single piece of material with stator platform 220. Also it should be understood that the annuli formed by rotor assembly 142 and stator assembly 144 can each be constructed as a single piece, as two semi-circular pieces that are joined together into a complete annulus, four quadrants that are joined together into a complete annulus, and the like.

Figure 3:
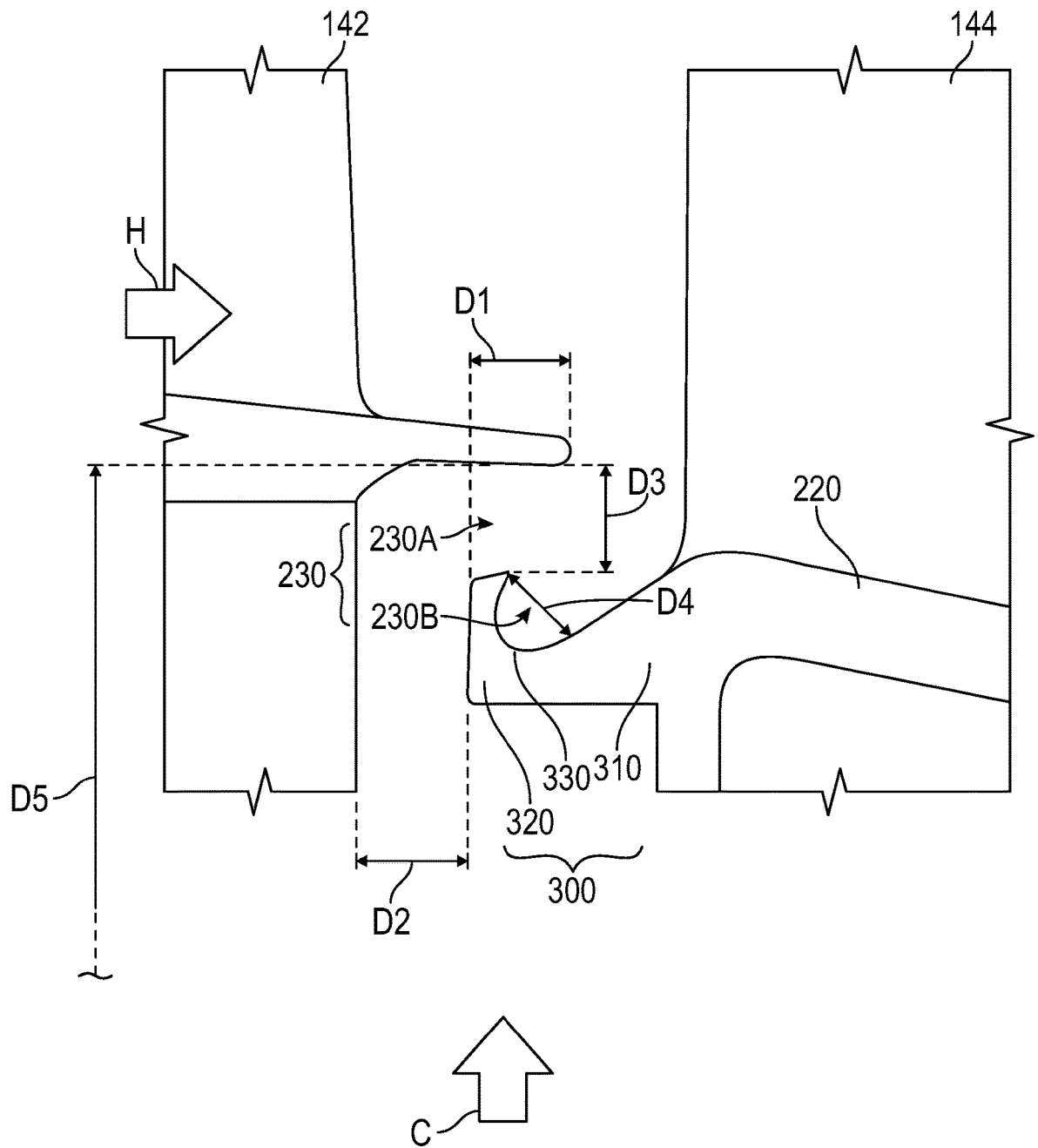
FIG. 3 illustrates a cross-sectional view of an example interface between a rotor platform of a rotor assembly and a stator platform of an aft stator assembly, comprising an integrated flow discourager, according to an embodiment.

FIG. 3 illustrates a cross-sectional view of an example interface between rotor platform 210 of a rotor assembly 142 and stator platform 220 of an aft stator assembly 144, comprising a flow discourager 300, according to an embodiment. In an embodiment, flow discourager 300 comprises a body 310 and a hook portion 320 that extends upstream from body 310. Hook portion 320 comprises an external surface 330 that defines a recirculation region or zone 230B within disk cavity 230. As illustrated, external surface 330 may have a hook-shaped cross-section that is configured to guide hot-gas ingress radially outward and downstream and back out through gap 230A between rotor platform 210 and stator platform 220.

FIG. 3 illustrates dimensions D1, D2, D3, D4, and D5. D1 is the axial distance between the leading edge of flow discourager 300, which is also the leading edge of stator platform 220, and the trailing edge of rotor platform 210. Thus, D1 represents the degree of overlap between rotor platform 210 and flow discourager 300 or stator platform 220. D2 is the axial distance between the leading edge of flow discourager 300, which is also the leading edge of stator platform 220, and the trailing edge of the stem of rotor assembly 142, which is radially inward from and supports rotor platform 210. D3 is the radial distance between the radially outward-most point of hook portion 320 of flow discourager 300 and the radially inward facing surface of rotor platform 210, along a radial axis. D4 is the diameter of an imaginary circle that approximates the curve of external surface 330. D5 is the radial distance between the radially inward facing surface of the trailing edge of rotor platform 210 and longitudinal axis L (i.e., the radial distance from the center line of gas turbine engine 100). In an embodiment, the ratio of D1 to D3 (i.e., D1/D3) is in the range of −0.25 to 10.0, the ratio of D2 to D5 (i.e., D2/D5) is in the range of 0.005 to 0.5, the ratio of D3 to D5 (i.e., D3/D5) is in the range of 0.005 to 0.05, and/or the ratio of D4 to D3 (i.e., D4/D3) is in the range of 0.25 to 10.0.

As illustrated, the trailing edge of platform 210 may extend farther downstream than the end of hook portion 320 that hooks back towards body 310. In other words, the end of hook portion 320 does not extend farther downstream than the trailing edge of platform 210 (i.e., D1 is greater than or equal to zero). Alternatively, the end of hook portion 320 may extend farther downstream than the trailing edge of platform 210 (i.e., D1 is less than zero) or may be flush with the trailing edge of platform 210 along a radial axis (i.e., D1 is equal to zero).

During operation, hot gas H will enter disk cavity 230 via gap 230A between rotor platform 210 and stator platform 220, and external surface 330 will guide the hot gas around recirculation zone 230B and back out through gap 230A. In particular, external surface 330 will guide the intruding hot gas flow radially inward, transition the hot gas flow to move axially upstream, transition the hot gas flow to move radially outward, and transition the hot gas flow to move axially downstream and radially outward and out of gap 230A.

The shape of hook portion 320 may be referred to as a voluted angel wing. The cross-sectional profile of external surface 330 of hook portion 320 may correspond to a segment of the golden spiral or of the Fibonacci spiral, which is an approximation of the golden spiral. The golden spiral is a logarithmic spiral whose growth factor is the golden ratio φ:

$$\varphi = \frac{1+\sqrt{5}}{2} = 1.618033$$

The Fibonacci spiral is an approximation of the golden spiral, which starts with a rectangle partitioned into two squares. In each step, a square, whose side is equal to the length of the rectangle's longest side, is added to the rectangle.

Figure 4:
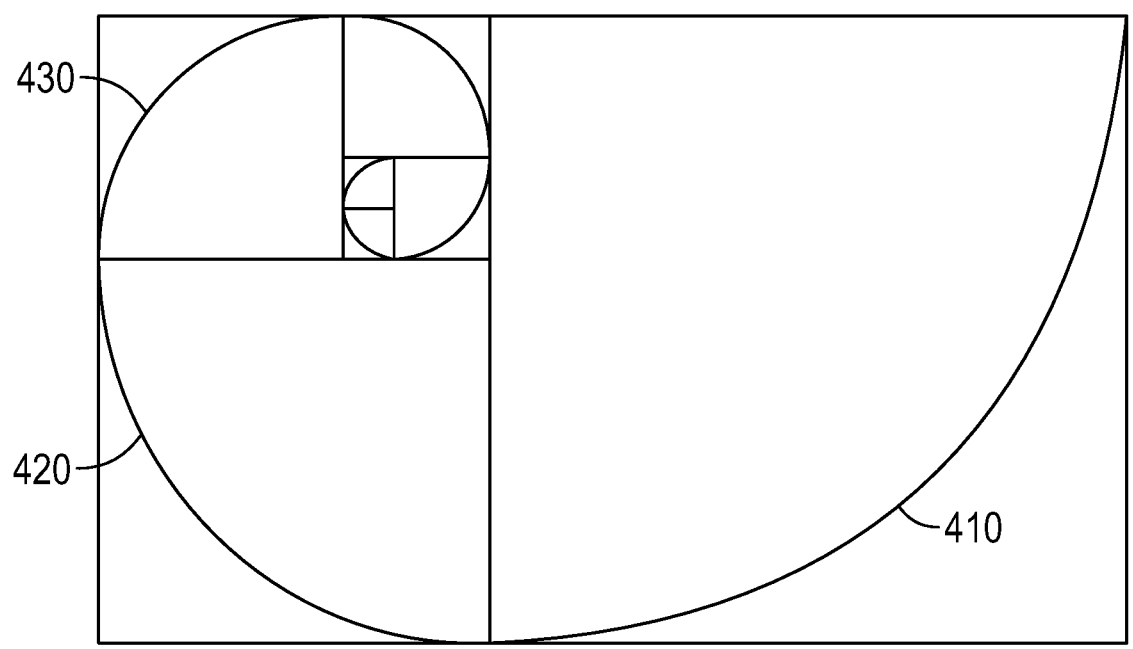
FIG. 4 illustrates a segment of the Fibonacci spiral that can be used as the cross-sectional profile of an external surface of a flow discourager, according to an embodiment.

FIG. 4 illustrates a segment of the Fibonacci spiral that can be used as the cross-sectional profile of external surface 330, which may be referred to as a volute hook. In particular, the cross-sectional profile of external surface 330 may comprise or approximate a segment of the golden spiral or Fibonacci spiral that comprises or consists of segment 410 in the first section, segment 420 in the second section, and segment 430 in the third section. Segments 410 and 430 may be shortened or lengthened as needed to fit the exact dimensions of disk cavity 230. In addition, any of the segments 410-430 may be otherwise modified as needed to fit the dimensions of disk cavity 230. Thus, it should be understood that, in practice, the exact cross-sectional profile of external surface 330 may be an approximation of a segment of the golden spiral or Fibonacci spiral, rather than an exact replication of a segment of the golden spiral or Fibonacci spiral.

It should be understood that the cross-sectional profile of external surface 330 may have other shapes than those specifically illustrated herein. For example, the cross-sectional profile of external surface 330 may comprise a segment of an ellipse or circle or consist of a segment of an ellipse or circle. In addition, it should be understood that the specific embodiments illustrated in the figures are not necessarily drawn to scale, and that the relative dimensions and distances may vary depending on the particular implementation.

Industrial Applicability

The disclosed flow discourager 300 can be installed or integrated between one or more pairs of a rotor assembly 142 and an aft stator assembly 144 in a turbine 140 of a gas turbine engine 100. Because the rotor assembly 142 must be free to rotate, the stator assembly 144 cannot abut the rotor assembly 142. Thus, a disk cavity 230 is formed between rotor assembly 142 and stator assembly 144. Flow discourager 300, which may be integrated into the upstream portion of a platform 220 of an aft stator assembly 144, creates a recirculation zone within disk cavity 230 to efficiently circulate hot gas H entering disk cavity 230 back out into the hot gas flow path. This prevents hot gas H from intruding further radially inward where it may have detrimental effects on the durability of turbine 140. In an embodiment, flow discourager 300 may be integrated into platform 220 of every stator assembly 144 that is downstream from a rotor assembly 142 in turbine 140 or of any subset of one or a plurality of stator assemblies 144 that are downstream from a rotor assembly 142 in turbine 140.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbomachine. Hence, although the present embodiments are, for convenience of explanation, depicted and described as being implemented in a gas turbine engine, it will be appreciated that it can be implemented in various other types of turbomachines and machines with turbines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A flow discourager for a turbine, the flow discourager comprising:
a body integrated into a platform of a stator assembly that is downstream from a rotor assembly; and
a hook portion that extends upstream from the body beyond any other portion of the platform of the stator and any other portion of the flow discourager and hooks back towards the body,
wherein the hook portion comprises a continuous external surface that defines a recirculation zone radially inward from a rotor platform of the rotor assembly.

2. The flow discourager of claim 1, wherein, in a cross-sectional view, a profile of the continuous external surface approximates a segment of a golden spiral.

3. The flow discourager of claim 1, wherein, in a cross-sectional view, a profile of the continuous external surface approximates a segment of a Fibonacci spiral.

4. The flow discourager of claim 1, wherein in a cross-sectional view, a profile of the continuous external surface comprises a segment of an ellipse.

5. The flow discourager of claim 1, wherein, in a cross-sectional view, a profile of the continuous external surface comprises a segment of a circle.

6. A turbine comprising at least one stage that comprises:
a rotor assembly including a rotor platform; and
an aft stator assembly that is downstream from the rotor assembly, wherein the aft stator assembly includes a stator platform comprising a flow discourager integrated into an upstream portion of the stator platform, and wherein the flow discourager includes
a body, and
a hook portion that extends upstream from the body further than any other portion of the stator platform and any other portion of the flow discourager and hooks back towards the body,
wherein the hook portion comprises a continuous external surface that defines a recirculation zone radially inward from the rotor platform of the rotor assembly.

7. The turbine of claim 6, wherein a ratio of an axial distance, between a leading edge of the flow discourager and a trailing edge of the rotor platform, to a radial distance, between a radially outward-most point of the hook portion and a radially inward facing surface of the rotor platform, is between −0.25 and 10.0.

8. The turbine of claim 6, wherein a ratio of an axial distance, between a leading edge of the flow discourager and a trailing edge of a stem of the rotor assembly, to a radial distance, between a radially inward facing surface of a trailing edge of the rotor platform and a longitudinal axis of the turbine, is between 0.005 and 0.5.

9. The turbine of claim 6, wherein a ratio of a radial distance, between a radially outward-most point of the hook portion and a radially inward facing surface of the rotor platform, to a radial distance, between a radially inward facing surface of a trailing edge of the rotor platform and a longitudinal axis of the turbine, is between 0.005 to 0.05.

10. The turbine of claim 6, wherein a ratio of a diameter of a circle, which approximates a curve of the continuous external surface, to a radial distance, between a radially outward-most point of the hook portion and a radially inward facing surface of the rotor platform, is between 0.25 and 10.0.

11. The turbine of claim 6, wherein, in a cross-sectional view, a profile of the continuous external surface approximates a segment of a golden spiral.

12. The turbine of claim 6, wherein, in a cross-sectional view, a profile of the continuous external surface approximates a segment of a Fibonacci spiral.

13. The turbine of claim 6, wherein in a cross-sectional view, a profile of the continuous external surface comprises a segment of an ellipse.

14. The turbine of claim 6, wherein, in a cross-sectional view, a profile of the continuous external surface comprises a segment of a circle.

15. The turbine of claim 6, wherein the flow discourager is radially inward from a downstream portion of the rotor platform and overlaps the downstream portion of the rotor platform along a radial axis that is perpendicular to a longitudinal axis of the turbine.

16. The turbine of claim 6, wherein the flow discourager is radially inward from the rotor platform and does not overlap the rotor platform along any radial axis that is perpendicular to a longitudinal axis of the turbine.

17. The turbine of claim 6, wherein a trailing edge of the rotor platform extends farther downstream than an end of the hook portion that hooks back towards the body.

18. The turbine of claim 6, wherein an end of the hook portion that hooks back towards the body extends at least as far downstream as a trailing edge of the rotor platform.

19. The turbine of claim 6, comprising a plurality of the at least one stage.

20. A gas turbine engine comprising:
a compressor configured to compress working fluid;
a combustor downstream from the compressor and comprising one or more fuel injectors configured to inject fuel into the working fluid and produce a combustion reaction; and
a turbine including at least one stage that comprises
a rotor assembly including a rotor platform, and
an aft stator assembly that is downstream from the rotor assembly, wherein the aft stator assembly includes a stator platform comprising a flow discourager integrated into an upstream portion of the stator platform, and wherein the flow discourager includes a body, and a hook portion that extends upstream from the body further than any other portion of the stator platform and any other portion of the flow discourager and hooks back towards the body, wherein the hook portion comprises a continuous external surface that defines a recirculation zone radially inward from the rotor platform of the rotor assembly.

* * * * *